A. H. LAMON.
AGRICULTURAL IMPLEMENT.
APPLICATION FILED MAR. 15, 1913.
1,070,493.
Patented Aug. 19, 1913.
2 SHEETS—SHEET 2.
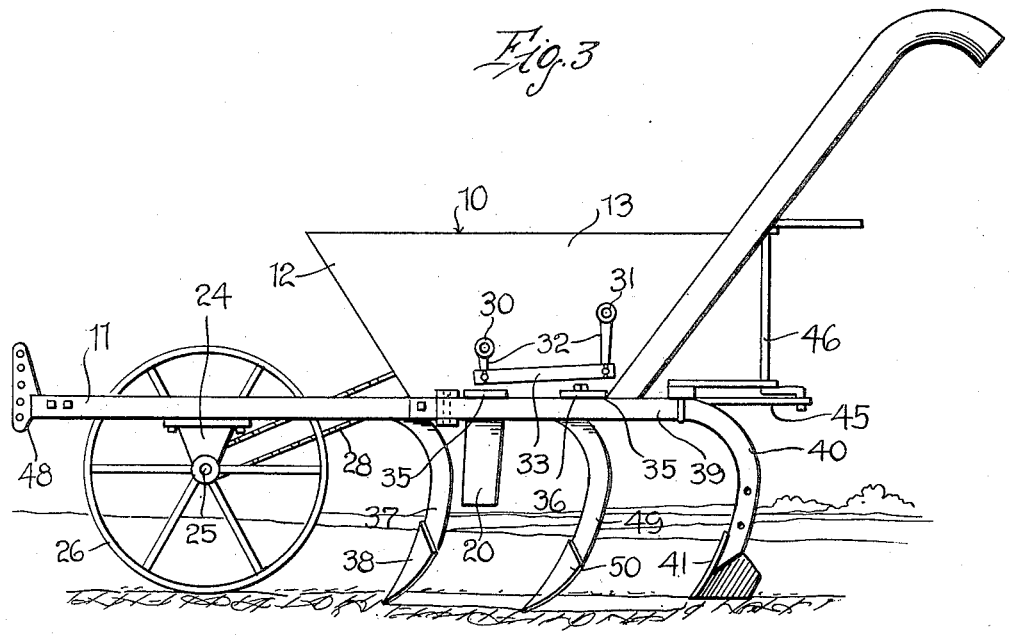
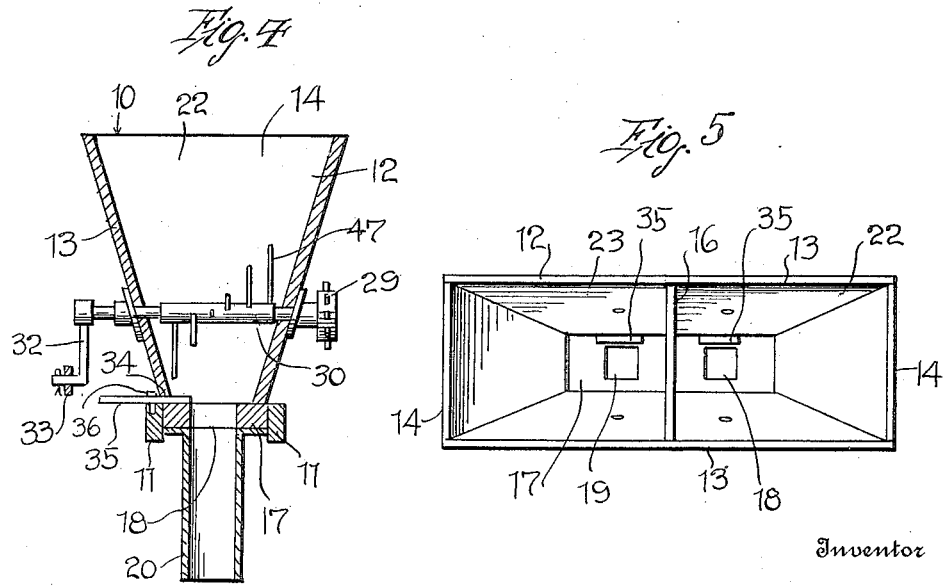
Witnesses
Robert M. Sutphen.
A. I. Hind.
Inventor
A. H. LAMON
By Watson E. Coleman
Attorney

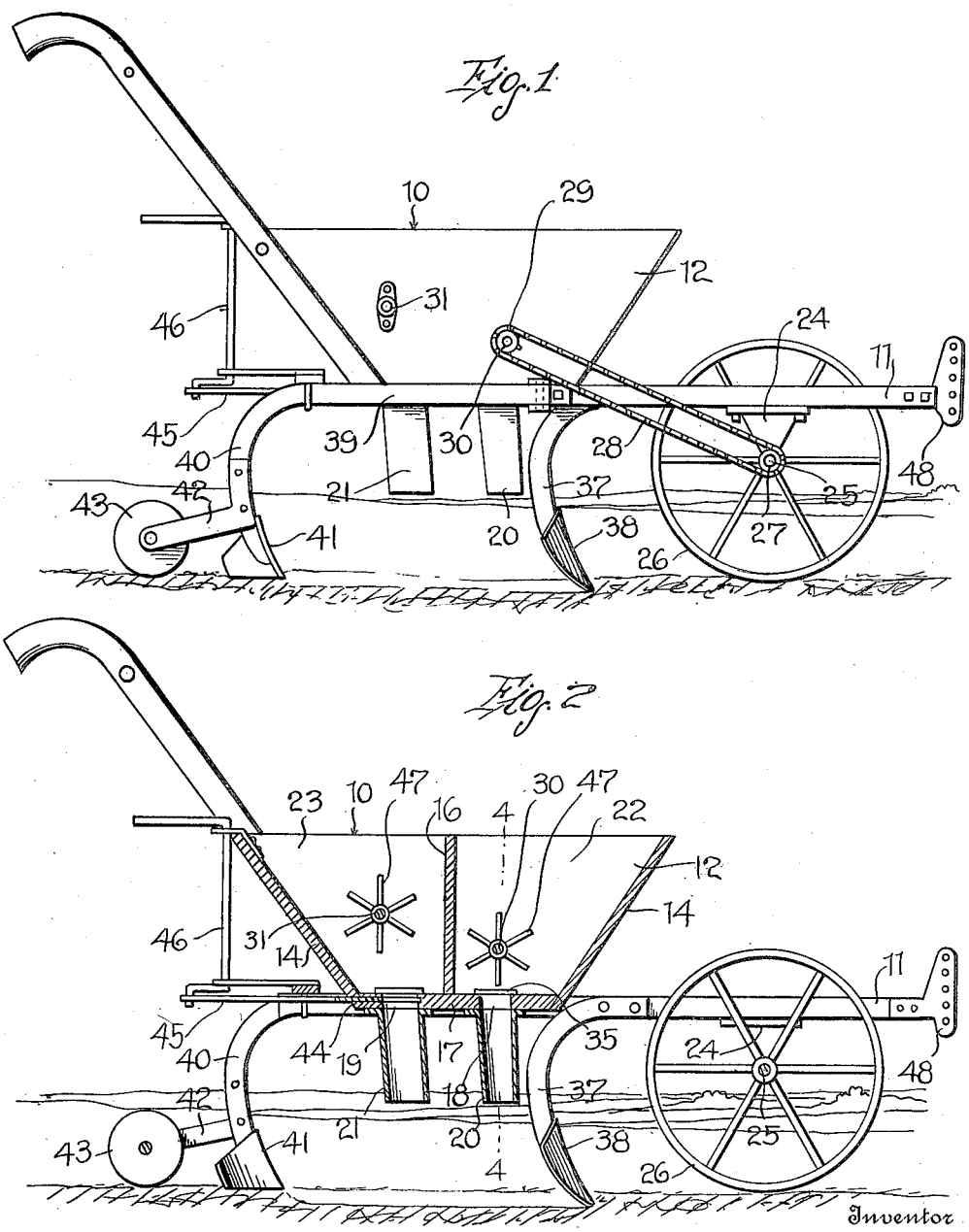

UNITED STATES PATENT OFFICE.

ARCHIE H. LAMON, OF NEW DECATUR, ALABAMA.

AGRICULTURAL IMPLEMENT.

1,070,493.    Specification of Letters Patent.    Patented Aug. 19, 1913.

Application filed March 15, 1913.   Serial No. 754,610.

*To all whom it may concern:*

Be it known that I, ARCHIE H. LAMON, a citizen of the United States, residing at New Decatur, in the county of Morgan and State of Alabama, have invented certain new and useful Improvements in Agricultural Implements, of which the following is a specification, reference being had to the accompanying drawings.

This invention relates to new and useful improvements in agricultural implements, and more especially to a combined cotton planter, grain drill, fertilizer distributer and lister.

An object of this invention is the provision of a machine such as described in which certain mechanism is detachably supported in order to make it possible to use the machine in mixing the fertilizer with the soil.

A further object of this invention is to improve and simplify machinery of this character, rendering it simple and inexpensive to manufacture, reliable and efficient in use, and readily operated.

With the above and other objects in view, this invention resides in the novel features of construction, formations, combinations and arrangements of parts to be hereinafter more fully described, claimed and illustrated in the accompanying drawings, in which—

Figure 1 is a side elevation of my invention; Fig. 2 is a longitudinal sectional view thereof; Fig. 3 is a view similar to Fig. 1 showing the additional plow standard attached; Fig. 4 is a transverse sectional view of my invention taken on the line 4—4 of Fig. 2; and Fig. 5 is a top plan view of the hopper.

Referring to the accompanying drawings by similar characters of reference throughout the several views, the numeral 10 designates generally my improved agricultural implement, which consists of a pair of spaced parallel side bars 11 upon which is mounted a hopper 12, consisting of upwardly and outwardly inclined side and end walls 13 and 14, the former of which are connected by a transverse partition 16, while these said side and end walls are connected at their lower edges by a bottom 17 formed with slots 18 and 19 from which depend the front and rear discharge spouts 20 and 21. The partition 16 produces within the hopper 12 front and rear compartments 22 and 23, the former of which is adapted to contain fertilizer, and the latter the seeds to be planted. Depending bearings 24 are attached to the under edges of the bars 11 adjacent their forward ends, and support an axle 25 upon the intermediate portion of which is keyed the supporting wheel 26, the upper side of the same being disposed between the side bars 11. This shaft 25 has also keyed thereon a sprocket wheel 27, which engages a chain 28, the said chain passing over a sprocket wheel 29 keyed to a transverse shaft 30, journaled in the opposite sides 13 of the hopper above the slot 18. A similar shaft 31 is journaled transversely of the hopper 12 in its side walls 13 above the slot 19 in the rear compartment 22. The shafts 30 and 31 have secured thereto crank arms 32 which are connected by means of a pitman 33 for the purpose of imparting a rotary movement to the shaft 31, upon the rotation of the shaft 30. One of the side walls 13 is slotted, as at 34, for the reception of sliding gages 35, which are disposed above the slots 18 and 19, for the purpose of limiting the passage of the fertilizer or the seeds therethrough. These gage plates 35, are held against movement by set screws 36.

A front plow attachment standard 37 is secured between the side bars 11 in the rear of the wheel 26, and has attached thereto a furrow opening share 38, while adjustably secured to the side bars 11 in advance of the hopper 12 are horizontal bars 39 curved downwardly at their rear ends to produce plow standards 40, to which are attached the furrow closing shares 41. Angle bars 42, are secured to the standards 40 and extend rearwardly therefrom, and have journaled therebetween a covering roller 43 by means of which the earth is packed over the seeds. The discharge spouts are provided at their upper ends with closures 44 which are connected by rods 45, to an operating member 46, by means of which the said closures 44 can be operated to allow the alternate passage of fertilizer and seeds through the side spouts 20 and 21. The shafts 30 and 31 are provided within the hopper with a plurality of agitating fingers 47 which fingers extend into the seed compartments 22 and 23, whereby upon rotary movement of the said shafts 30 and 31 the contents thereof will be drawn into the spouts 20 and 21.

Obviously as the machine is propelled over the ground by its attachment to a draft animal through means of the adjustable draft attachment 48, the rotation of the wheel 26 causes the rotation of the shafts 30 and 31, which through the medium of the fingers 47 draws the fertilizer and seeds into the spouts 20 and 21, from whence they will be alternately deposited by the operating member 26 and its connections in the furrow dug by the share 38. This furrow is then closed by the shares 41 and the ground is packed upon the seeds by the roller 43.

When it is desired to use the machine as a fertilizer distributer only, the roller 43 is removed together with the rear spout 21, and an additional standard 49 is attached to the beams 11 in place of said spout 21. This standard 49 is equipped with a share 50, the purpose of which is to mix the fertilizer with the soil.

It should be understood in this connection that various minor changes in the specific details of construction can be resorted to within the scope of the appended claims, without departing from or sacrificing any of the advantages of the invention.

From the foregoing disclosures it will be obvious that an agricultural implement is provided which will fulfil all of the necessary requirements of such a machine.

Having thus fully described this invention what I claim as new and desire to protect by Letters Patent is:

1. The combination in a device such as described, of supporting beams, a hopper mounted thereon, distributing means within said hopper, spouts extending from the distributing means, one of said spouts being removable, and a standard interchangeable with said removable spout.

2. In a machine such as described the combination with a plurality of beams, a hopper supported thereon, distributing means contained within the hopper, means for operating the distributing means, spouts extending from the distributing means, one of said spouts being removable, a standard interchangeable with the removable spout, means arranged in advance of said spouts for digging a furrow, and means arranged in the rear of the spout for closing the furrow.

3. In a machine such as described the combination with a pair of spaced bars, standards adjustable upon said bars, a share standard arranged in advance of the first mentioned standards, a hopper supported upon the beams, distributing means contained within said hoppers, spouts extending from the distributing means, one of said spouts being removable, means for controlling passage through the spouts, and an additional standard interchangeable with the removable spout.

4. In a machine such as described the combination with a pair of spaced bars, a wheel supporting said bars, an axle carried by the bars and supporting the wheel, a sprocket wheel keyed to the axle, a hopper supported upon the bars, shafts journaled in said hopper, an operative connection between said shafts, a sprocket keyed to one of said shafts and engaging the sprocket chain, gages disposed within said hopper, agitator fingers formed upon the shafts and projecting through slots formed in the bottom of the hopper, spouts depending from said slots, means for controlling passage through the spouts, a standard arranged in advance of the spouts, standards disposed at the rear of the spouts, shares secured to the standards, a roller supported by certain of the standards, one of said spouts being removable, and a removable standard interchangeable with the removable spout.

In testimony whereof I hereunto affix my signature in the presence of two witnesses.

ARCHIE H. LAMON.

Witnesses:
J. B. BRYANT,
CLYDE BLANTAN.

---

Copies of this patent may be obtained for five cents each, by addressing the "Commissioner of Patents, Washington, D. C."